United States Patent
Bhandari et al.

(10) Patent No.: US 12,468,292 B2
(45) Date of Patent: Nov. 11, 2025

(54) METHOD AND SYSTEM FOR SYNCHRONIZING PLURALITY OF EVENTS IN AN ASSEMBLY LINE

(71) Applicant: Tata Consultancy Services Limited, Mumbai (IN)

(72) Inventors: Gaurav Bhandari, Bangalore (IN); Raghunath D, Bangalore (IN); Prakash M. Hiremath, Bangalore (IN); Ashish Vasant Joglekar, Bangalore (IN); Devadatta Madhukar Kulkarni, Rochester Hills, MI (US); Sampad Mohanty, Los Angeles, CA (US); Venkatesh Prabhu, Bangalore (IN); Rajeev Shorey, Haryana (IN); Rajesh Sundaresan, Bangalore (IN); Jeffrey David Tew, Rochester, MI (US)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/208,926

(22) Filed: Jun. 13, 2023

(65) Prior Publication Data
US 2023/0409013 A1   Dec. 21, 2023

(30) Foreign Application Priority Data
Jun. 13, 2022   (IN) .............................. 202241033679

(51) Int. Cl.
*G05B 19/418*   (2006.01)

(52) U.S. Cl.
CPC .................. *G05B 19/41865* (2013.01); *G05B 2219/32252* (2013.01)

(58) Field of Classification Search
CPC ........ G05B 19/41865; G05B 19/41805; G05B 19/4183; G05B 2219/24186;
(Continued)

(56) References Cited

U.S. PATENT DOCUMENTS 8,837,530 B2 * 9/2014 Agrawala ............. H04J 3/0676
                                                       370/503
2008/0079595 A1  4/2008 Baier et al.
(Continued)

FOREIGN PATENT DOCUMENTS

| CA | 2263402 A   | * | 8/1997  |                  |
|----|-------------|---|---------|------------------|
| EP | 3876442 A2  | * | 9/2021  | ...... H04Q 9/04 |
| WO | WO-2020035229 A1 | * | 2/2020 | ...... G05B 19/0423 |

OTHER PUBLICATIONS

Chowdhury, "Synchronization to extreme events in moving agents" (Year: 2019).*

(Continued)

*Primary Examiner* — Thien T Mai
(74) *Attorney, Agent, or Firm* — Finnegan, Henderson, Farabow, Garrett & Dunner, LLP

(57) ABSTRACT

Present disclosure relates to method and synchronization system for synchronizing plurality of events associated with one or more processes in assembly line for tracing entity. Initially, information related to plurality of events associated with one or more processes from one or more devices is received, where each of the plurality of events comprises respective first timestamp. Upon receiving, the first timestamp between each of the plurality of events is synchronized by performing first level and second level synchronization. The synchronization converts first timestamp into second timestamp with respect to common reference timestamp. Further, the synchronization system may identify one or more defects based on quality value assigned to entity. Thus, the present disclosure helps the synchronization system to efficiently trace entity when a defect is identified and replaces/repairs the entity.

9 Claims, 5 Drawing Sheets

(58) Field of Classification Search
CPC ........... G05B 2219/24187; G05B 2219/32065; G05B 2219/32252; G05B 2219/31217; G05B 2219/25483; G05B 19/0426; G05B 19/418; G05B 2219/2231; G05B 9/03
See application file for complete search history.

(56) References Cited

U.S. PATENT DOCUMENTS

| | | | | |
|---|---|---|---|---|
| 2012/0320809 A1* | 12/2012 | Sturm | ............... | H04W 52/0235 370/311 |
| 2021/0048798 A1* | 2/2021 | Bulanda | ............. | G05B 19/4185 |
| 2021/0116902 A1* | 4/2021 | Graf | ................... | G05B 23/0208 |

OTHER PUBLICATIONS

Simon, "An Overview of Clock Synchronization" (Year: 2005).*
Multi-scale event synchronization analysis for unravelling climate processes: a wavelet-based approach (Year: 2017).*

* cited by examiner

METHOD AND SYSTEM FOR SYNCHRONIZING PLURALITY OF EVENTS IN AN ASSEMBLY LINE

PRIORITY CLAIM

This U.S. patent application claims priority under 35 U.S.C. § 119 to: Indian Patent Application No. 202241033679, filed on Jun. 13, 2022. The entire contents of the aforementioned application are incorporated herein by reference.

Technical Field

The present subject matter is generally related to the field of time synchronization technology, more particularly, but not exclusively to a method and system for synchronizing plurality of events associated with one or more processes in an assembly line for tracing an entity.

BACKGROUND

In manufacturing assembly lines, manufacturing components come from various points such as production line, manufacturing line, and the like and are assembled in a manufacturing assembly line. Tracing the manufactured components is important as the components may be recalled for repair or replacement in the manufacturing companies. For example, consider an Electronic Control Unit (ECU) of a vehicle is manufactured in an automobile industry and the manufactured ECU goes through some faulty manufacturing process at a certain time. In such case, the ECU needs to be recalled for repair or replacement. Typically, manufacturing companies may assign quality indices to the manufactured components depending on either normalcy of process flow or level of stoppage or fault in the manufacturing line, at the time of manufacturing of that component. For instance, a component may be assigned a lower quality index depending on the fault. These quality indices enables better and targeted recalls and reduces cost.

Generally, tracing the manufactured components is difficult in long manufacturing lines. In the manufacturing lines there are many processes which needs to be monitored. Further, data related to the monitoring is processed and compressed and sent to a central entity for further processing. However, during transmission process, there may be congestions, delays, re-ordering, and loss of the data. Also, timestamps of the data at various stages in the manufacturing line may not be perfect as each device in the manufacturing line operates with its own clock. Thus, it may be difficult to trace the components when a fault is detected.

Currently, though existing systems trace the components in the manufacturing lines using batch numbers, manufacturing dates and so on. The existing system are unable to efficiently track the components as each device have their individual clocks and there is no mechanism of synchronizing clock times of the devices. Further the existing systems do not provide any method to synchronize individual clock times of the devices to recall the components efficiently in case any defect is detected.

The information disclosed in this background of the disclosure section is only for enhancement of understanding of the general background of the invention and should not be taken as an acknowledgement or any form of suggestion that this information forms the prior art already known to a person skilled in the art.

SUMMARY

Embodiments of the present disclosure present technological improvements as solutions to one or more of the above-mentioned technical problems recognized by the inventors in conventional systems. For example, in an embodiment, the present disclosure relates to a method for synchronizing plurality of events associated with one or more processes in an assembly line for tracing an entity. The method includes receiving information related to the plurality of events associated with the one or more processes from one or more devices in the assembly line. Each of the plurality of events comprises a respective first timestamp. Upon receiving, the method includes synchronizing the first timestamp between each of the plurality of events by performing a first level synchronization and a second level synchronization. The first level synchronization comprises correlating each of a pair of events of the plurality of events based on the first timestamp related to respective events in the pair of events to obtain synchronization parameters. Upon performing the first level of synchronization, the method includes performing the second level of synchronization. The second level of synchronization comprises updating the synchronization parameters to convert the first timestamp of each of the plurality of events to a second timestamp with respect to a common reference timestamp.

In an embodiment, the present disclosure relates to a synchronization system for synchronizing plurality of events associated with one or more processes in an assembly line for tracing an entity. The synchronization system includes a processor and a memory communicatively coupled to the processor. The memory stores processor-executable instructions, which on execution cause the processor to synchronize plurality of events associated with one or more processes in the assembly line for tracing the entity. The synchronization system receives information related to the plurality of events associated with the one or more processes from one or more devices in the assembly line. Each of the plurality of events comprises a respective first timestamp. Upon receiving, the synchronization system synchronizes the first timestamp between each of the plurality of events by performing a first level synchronization and a second level synchronization. The first level synchronization comprises correlating each of a pair of events of the plurality of events based on the first timestamp related to respective events in the pair of events to obtain synchronization parameters. Upon performing the first level of synchronization, the synchronization system performs the second level of synchronization. The second level of synchronization comprises updating the synchronization parameters to convert the first timestamp of each of the plurality of events to a second timestamp with respect to a common reference timestamp.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
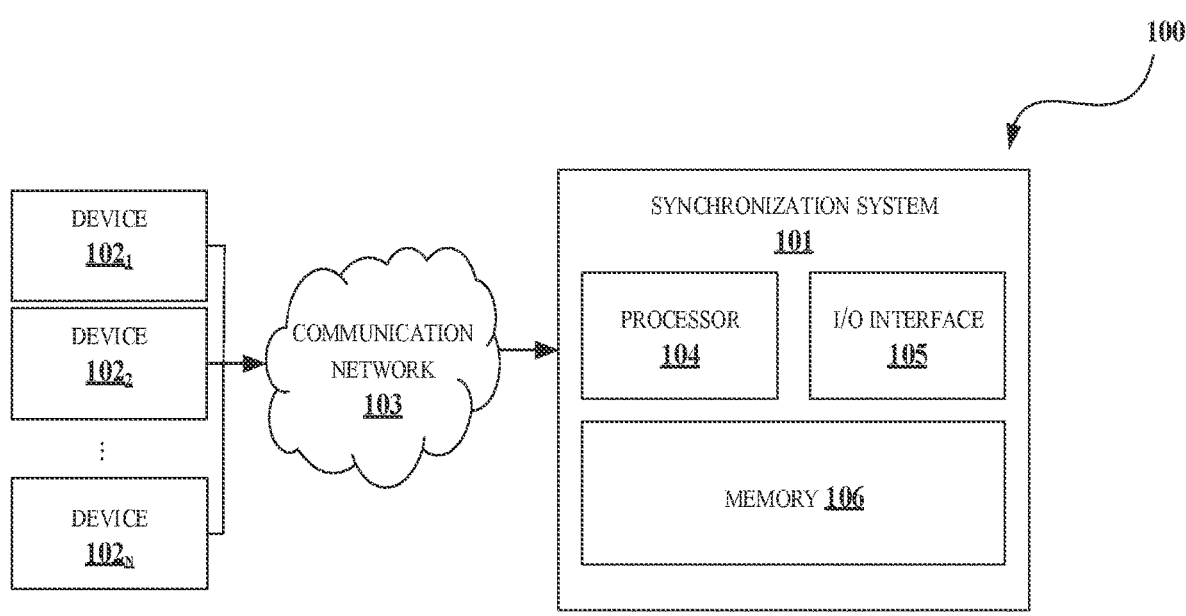
FIG. 1 shows an exemplary environment for synchronizing plurality of events associated with one or more processes in an assembly line for tracing an entity, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprise", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "include", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Referring now to the drawings, and more particularly to FIGS. 1 to 6, where similar reference characters denote corresponding features consistently throughout the figures, there are shown preferred embodiments and these embodiments are described in the context of the following exemplary system and/or method.

Present disclosure relates to a method and a synchronization system for synchronizing plurality of events associated with one or more processes in an assembly line for tracing an entity. The entity may refer to an object or a component which is manufactured in a manufacturing industry. Generally, devices in manufacturing industries have their own clock time and offsets which needs to be synchronized in order to trace the entity incase when a fault is detected. The synchronization system receives plurality of events associated with the one or more processes from the one or more devices, where each of the plurality of events have their own respective first timestamps. The first timestamp is synchronized between the plurality of events by performing a two-level synchronization. The first timestamp is synchronized to a second timestamp with respect to a common reference timestamp to trace the entity. Thus, the present disclosure synchronizes the plurality of events of the one or more devices in the manufacturing industries in order to efficiently trace entities.

FIG. 1 shows an exemplary environment 100 for synchronizing plurality of events associated with one or more processes in an assembly line for tracing an entity. The environment 100 may include a synchronization system 101, one or more devices ($102_1$, $102_2$ . . . $102_N$, hereinafter referred as one or more devices 102) and a network 103. In an embodiment, the synchronization system 101 may be implemented in the one or more devices 102 associated with a manufacturing industry. The manufacturing industry may include, but is not limited to, automobile manufacturing industry, printer manufacturing industry, electronics manufacturing industry, and the like. The one or more devices 102 are used for manufacturing the component/entity at the manufacturing industry. The one or more devices 102 may include, but not limited to, a line loader, a screen printer, a pick-and-place machine, a reflow oven, a line unloader, a computerized milling machine, a boring machine, and the like. A person skilled in the art may understand that the one or more devices may vary based on the manufacturing industry. The synchronization system 101 may include, but is not limited to, mobile phone, a tablet, a smart phone, a laptop computer, a desktop computer, a Personal Computer (PC), a notebook and the like. The one or more devices 102 communicates with the synchronization system 101 via the communication network 103 for synchronizing a plurality of events associated with one or more processes in the assembly line for tracing an entity. The entity may refer to an object or a component which is manufactured in a manufacturing industry. The entity may include, but is not limited to, ECU, water bottles, sensor board, printers, and the like. A person skilled in the art may understand that the entity may vary based on the type of manufacturing industry. Further, the synchronization system 101 may include a processor 104, I/O interface 105, and a memory 106. In some embodiments, the memory 106 may be communicatively coupled to the processor 104. The memory 106 stores instructions, executable by the processor 104, which, on execution, may cause the synchronization system 101 to synchronize the plurality of events associated with one or more processes in the assembly line for tracing the entity, as disclosed in the present disclosure.

In an embodiment, the communication network 103 may include, without limitation, a direct interconnection, Local Area Network (LAN), Wide Area Network (WAN), Controller Area Network (CAN), wireless network (e.g., using a Wireless Application Protocol), the Internet, and the like.

The synchronization system 101 may receive information related to the plurality of events associated with the one or more processes from the one or more devices 102 in the assembly line. The plurality of events may be procedures associated with manufacturing of the component/entity at the manufacturing industry. The one or more processes may vary based on the manufacturing industry. The one or more processes may include, but is not limited to, sheet-fed process, R2R process, additive manufacturing process, and the like. A person skilled in the art may understand that the plurality of events, the one or more processes may be related to any manufacturing industry. Each of the plurality of events include a respective first timestamp. For example, consider a plastic bottle manufacturing industry. The plurality of events related to bottle manufacturing may include, but is not limited to, melting plastic by heat, providing shape to parison, heating the parison by quartz heater, cooling the plastic, and the like. The one or more processes related to bottle manufacturing may include, but is not related to, preparing plastic pellets, generating parison, re-heat process, cooling process, and the like. The one or more devices 102 related to the bottle manufacturing may include, but is not limited to, injection moulding device, blow moulding device, and the like.

Particularly, the information received by the synchronization system 101 may include plurality of steps. Initially, the synchronization system 101 analyses one or more parameters related to the one or more devices 102 in the assembly line. The one or more parameters may include, but is not limited to, if a machine is a legacy machine used for manufacturing the entity, if the machine is internetworked or not internetworked, if modifications is possible to the machines, and the like. The term machine and the one or more devices 102 are same and have been used alternatively in the present description. Upon analysing, the synchronization system 101 identifies one or more sensors and positioning of the one or more sensors at the one or more devices 102. Further, knowing what information to sense, where to sense, and how to sense is very important for identifying the one or more sensors and the positioning of the one or more sensors. For example, consider a line loader, the line loader has vibrations as it pushes boards. Therefore, the type of sensors which is required may be a vibration sensor and a proximity sensor. Similarly, for a screen printer, the type of sensor which may be required is an energy meter as the screen printer may consume high power during and thus its state could be better tracked by the energy meter. Similarly, a proximity sensor may be placed between two pick-and-place machines to track movement in conveyor belt. Further, the synchronization system 101 may determine a rate for sensing information by the identified one or more sensors. The information relates to the plurality of events associated with the one or more processes of the one or more devices 102. For example, the proximity sensors are to be calibrated suitably to ensure that only relevant and compressed on/off (present/absent) binary data is submitted to a server. Similarly, vibration sensor data may be transmitted at a high rate to enable proper machine state signature is captured. Similarly, the speed of the conveyor belt may be different at different places, and the proximity sensors near the high-speed conveyor belts may have to sample at higher rates in accordance with the speeds. Upon determining the rate, the synchronization system 101 determines a rate of synchronizing the plurality of events for the first level synchronization. In an embodiment, the rate of synchronizing the plurality of events relates to interaction between the one or more devices 102 in the assembly line. For example, if the line loader and the pick-up-place machine interact frequently then the rate of synchronizing the plurality of events may be high. While, if the line loader and the pick-up-place machine interact less frequently then the rate of synchronizing the plurality of events may be low. Upon determining the rate of synchronizing the plurality of events, the synchronization system 101 determines a network for transmitting the information related to the plurality of events. The plurality of events is synchronized upon transmission of the information. During transmission of the information, the information/data from the one or more devices 102 are safely transported to a local server. The transmission can be performed in one or more ways. The one or more ways may include, but is not limited to, a single-hop way, a multi-hop way and the like. The transmission of the information/data must be done in such a way that there is minimal data loss due to congestion, packet error, and the like so that the entity can be traced efficiently. For example, consider packetized transmission of the information/data. In the packetized transmission, the packets may need to be suitably ordered at delivery point. In an embodiment, mode of transmission of the information may also be based on distance over which the data must be transported for synchronization.

Upon receiving the information, the synchronization system 101 synchronizes the first timestamp between each of the plurality of events by performing a first level synchronization and a second level synchronization. The first level synchronization includes correlating each pair of events from the plurality of events based on their respective first timestamp. The first timestamp is related to respective events in the pair of events to obtain synchronization parameters. Correlating each of the pair of events of the plurality of events based on the first timestamp is controlled periodically based on rate of skew drift of the plurality of events and frequency of correlating the first timestamp of the plurality of events. That is, the pair of events are correlated based on their skew drift rate and how often the devices associated with the plurality of events interact with each other. While in the second level of synchronization, the synchronization parameters are updated to convert the first timestamp of each of the plurality of events to the second timestamp with respect to a common reference timestamp. That is, the synchronization system 101 converts the first timestamp of each of the plurality of events into a global timestamp (also referred as the second timestamp in the present description) with respect to the common reference timestamp by updating the synchronization parameters. The synchronization parameters comprise skew drift and offset value related to the first timestamp of each of the plurality of events. In an embodiment, the synchronization system 101 may provide feedback to the network for one or more corrective actions when the first timestamp of the plurality of events are not synchronized.

Upon synchronizing, the synchronization system 101 maps the plurality of events based on weights assigned to each pair of events of the plurality events and weights assigned to each event within each of the pair of events. The weights assigned to each of the plurality of events is based on predefined parameters. The predefined parameters may include, but is not limited to, an arrival time, a departure time and a processing duration of the entity, number of distinct data associated with the plurality of events, and the like. Upon mapping, the synchronization system 101 traces an entity obtained from the one or more processes in the assembly line based on the mapping of the plurality of events. For example, in the bottle manufacturing, the entity may be a bottle.

In an embodiment, the synchronization system 101 identifies one or more defects in the entity based on a corresponding quality value assigned to the entity. The quality value is a combination of weights assigned to each of the plurality of events. For example, in the bottle manufacturing, the one or more defects identified may include, but is not limited to, defect in the shape of the bottle, defect in the parison, and the like. A person skilled in the art may understand that the one or more defects may depend on the type of entity being manufactured at the manufacturing industry. Upon identifying the one or more defects, the synchronization system 101 may recall the entity associated with the one or more defects and replace with a new entity or repair the entity.

Figure 2:
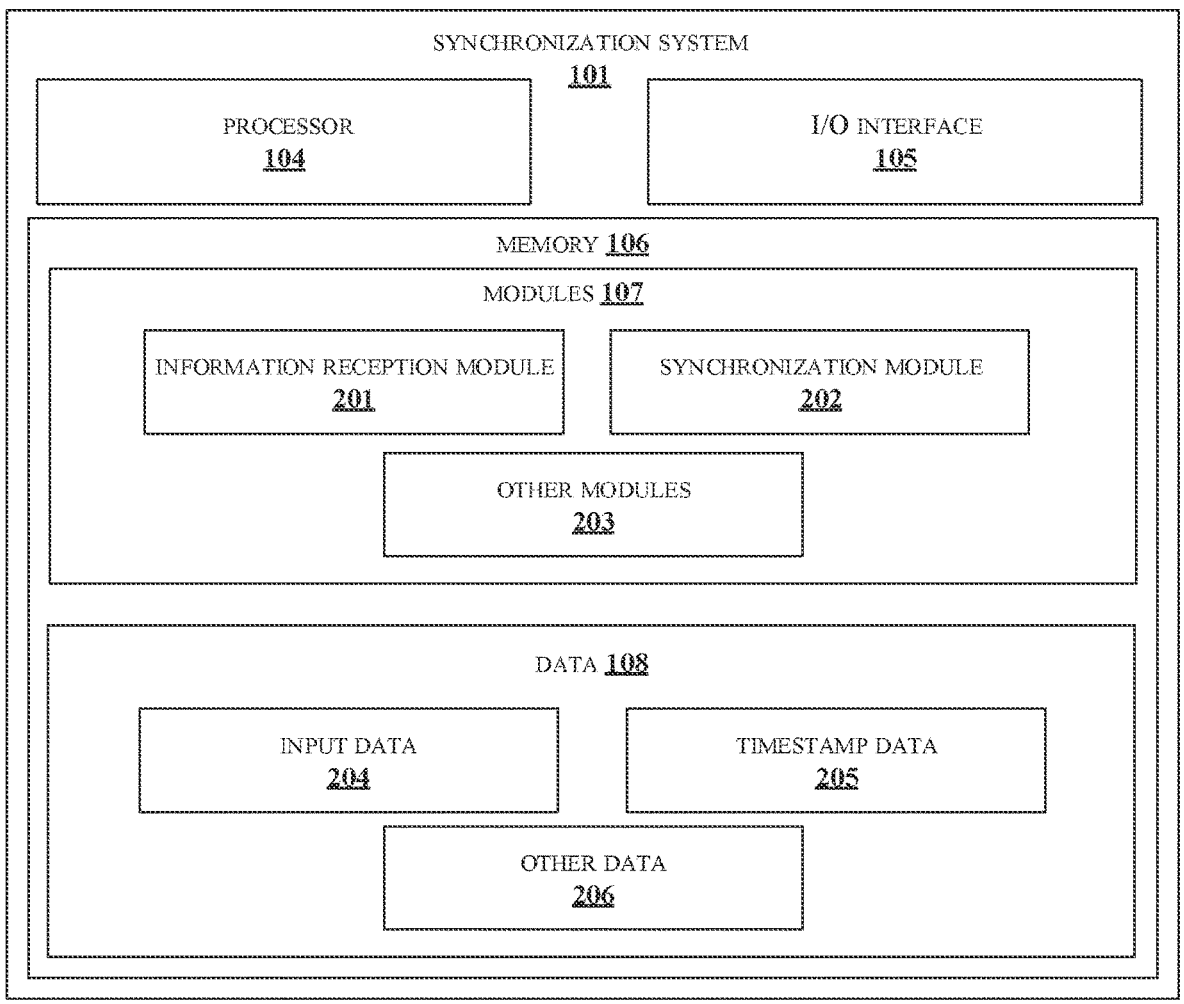
FIG. 2 shows a detailed block diagram of a synchronization system for synchronizing plurality of events associated with one or more processes in an assembly line, in accordance with some embodiments of the present disclosure.

FIG. 2 shows a detailed block diagram of a synchronization system for synchronizing plurality of events associated with one or more processes in an assembly line for tracing an entity, in accordance with some embodiments of the present disclosure.

Data 108 and the one or more modules 107 in the memory 106 of the synchronization system 101 is described herein in detail. In one implementation, the one or more modules 107 may include, but are not limited to, an information reception module 201, a synchronization module 202, and one or more other modules 203, associated with the synchronization system 101. In an embodiment, the data 108 in the memory 106 may include input data 204, timestamp data 205, and other data 206 associated with the synchronization system 101.

In an embodiment, the data 108 in the memory 106 may be processed by the one or more modules 107 of the synchronization system 101. In an embodiment, the one or more modules 107 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 107 of the present disclosure along with the data 108 functions to synchronize plurality of events associated with one or more processes in the assembly line for tracing the entity.

The input data 204 may include information related to the plurality of events associated with the one or more processes from the one or more devices 102 in the assembly line. The information may include details about the plurality of events and respective first timestamp related to the entity which is manufactured at the manufacturing industry.

The timestamp data 205 comprises the first timestamp associated with the plurality of events. The first timestamp refers to the local timestamp associated with each of the plurality of events. Also, the timestamp data 205 comprises the second timestamp obtained by converting the first timestamp with respect to a common reference timestamp.

The other data 206 may store data, including temporary data and temporary files, generated by modules for performing the various functions of the synchronization system 101.

Figure 3:
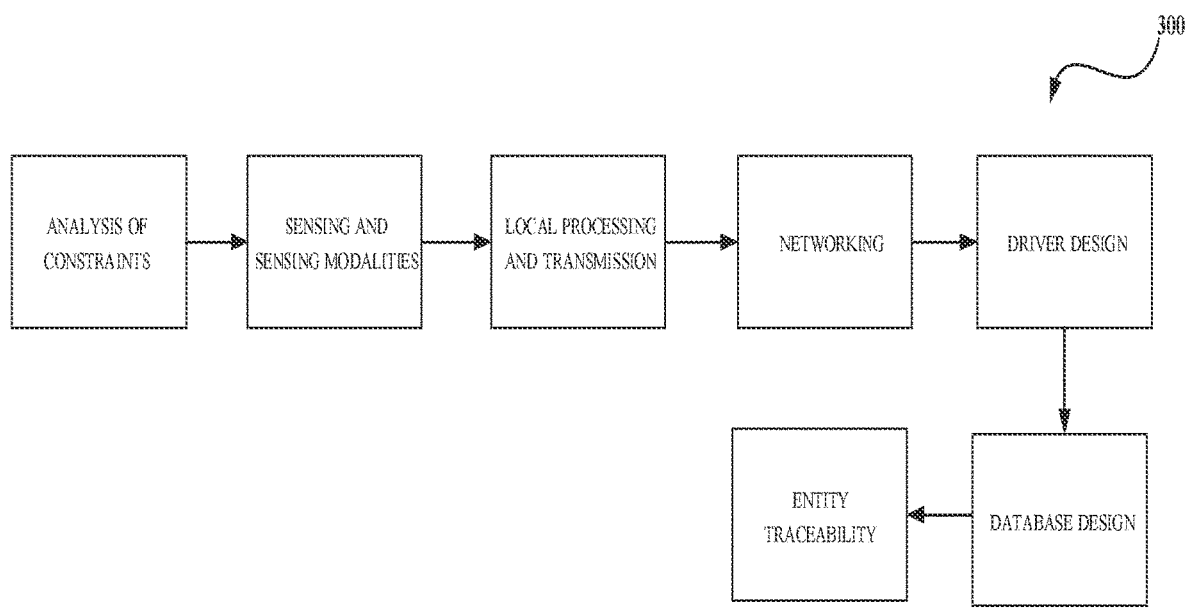
FIG. 3 illustrates a block diagram for synchronizing plurality of events associated with one or more processes in an assembly line, in accordance with some embodiments of present disclosure.

The information reception module 201 may receive information related to the plurality of events associated with the one or more processes from the one or more devices 102 in the assembly line. Each of the plurality of events comprises the respective first timestamp. For example, consider melting of plastic by heat as one of the events which occurred at 10:00 AM, providing shape to parison is another event which occurred at 11:30 AM, heating the parison by quartz heater which occurred at 2:30 PM, and cooling the plastic which occurred at 5:00 PM. The above-mentioned timestamps for the plurality of events may be referred as the first timestamp. The information related to the plurality of events is received by performing one or more steps. FIG. 3 shows the steps for receiving the information related to the plurality of events. Initially, the information reception module 201 analyses one or more parameters related to the one or more devices 102 in the assembly line. The one or more parameters may include, but is not limited to, if a machine is a legacy machine, if the machine is internetworked or not internetworked, if modifications is possible to the machines, and the like. In an embodiment, the one or more parameters may be taken as constraints for decision making. Upon analysing, the information reception module 201 may identify one or more sensors and positioning of the one or more sensors at the one or more devices 102. Further, the information reception module 201 may sense the information using the one or more sensors. For example, consider a line loader, the line loader has vibrations as it pushes boards. Therefore, the type of sensors which is required may be a vibration sensor and a proximity sensor. Similarly, for a screen printer, the type of sensor which may be required is an energy meter as the screen printer may consume high power during and thus its state could be better tracked by the energy meter.

Similarly, a proximity sensor may be placed between two pick-and-place machines to track movement in conveyor belt. Further, the information reception module 201 may determine the rate for sensing information by the identified one or more sensors. For example, the proximity sensors are to be calibrated suitably to ensure that only relevant and compressed on/off (present/absent) binary data is submitted to a server. Similarly, the vibration sensor data may be transmitted at a high rate to enable proper machine state signature is captured. Similarly, the speed of the conveyor belt may be different at different places, and the proximity sensors near the high-speed conveyor belts may have to sample at higher rates in accordance with the speeds. Upon determining the rate, the information reception module 201 determines a rate of synchronizing the plurality of events for the first level synchronization. In an embodiment, the rate of synchronizing the plurality of events relates to interaction between the one or more devices 102 in the assembly line. For example, if the line loader and the pick-up-place machine interact frequently then the rate of synchronizing the plurality of events may be high. While, if the line loader and the pick-up-place machine interact less frequently then the rate of synchronizing the plurality of events may be low. Upon determining the rate of synchronizing the plurality of events, the information reception module 201 determines a network for transmitting the information related to the plurality of events. The plurality of events is synchronized upon transmission of the information.

During transmission of the information, the information/data from the one or more devices 102 are safely transported to a local server. The transmission can be performed in one or more ways. The one or more ways may include, but is not limited to, a single-hop way, a multi-hop way and the like. The transmission of the information/data may be performed in such a way that there is minimal data loss due to congestion, packet error, and the like so that the entity can be traced efficiently. For example, consider packetized transmission of the information/data. In the packetized transmission, the packets need to be suitably ordered at delivery point. In an embodiment, mode of transmission of the information may also be based on distance over which the data must be transported for synchronization. In an embodiment, the information/data may be transferred in one or more ways to a gateway or relay. The gateways relay the information/data to the local server. Finally, the local server either sends it to storage or the cloud for processing. The one or more ways may include, but is not limited to, Bluetooth, wired interface, General Purpose Input/Output (GPIO), one or more protocols, Modbus protocol, and the like.

Upon receiving the information related to the plurality of events, the synchronization module 202 may synchronize the first timestamp between each of the plurality of events by performing a first level synchronization and a second level synchronization. The first level synchronization comprises correlating each of a pair of events of the plurality of events based on the first timestamp related to respective events in the pair of events to obtain synchronization parameters. The synchronization parameters comprise skew drift and offset value related to the first timestamp of each of the plurality of events. For example, consider a device "i" maintains number of offset update measurements $M_{ij}$ (estimate of $\alpha_{ij}$ and estimate of $O_{ij}$) from a device "j" to the device "i". The device i makes the network update only if all (other devices') neighbours' $M_{ij}$'s at the device i are balanced, i.e., all of them are roughly equal where tolerance from equality is measured according to some discrimination or distance measure. In an embodiment, if it is determined that the update needs to be performed, the update is performed using equation (1) as shown below.

$$\hat{O}_i \leftarrow (1-a)\hat{O}_i + a(\hat{O}_j + \hat{O}_{ji}) \quad (1)$$

Further, if the offset update measurement is received, and the measurement count is in excess (as determined using the equation 1), then the measurement is saved in the memory 106 in case a deficiency is noticed due to other devices' updates. In an embodiment, sum of the offset value in any loop is "0" and product of the skew drift in any loop is "1". Also, the skew drift may be alternatively written as the sum of logarithm of the pairwise skews is "0". This may be performed by using techniques such as, a gossip algorithm, as shown in equation 2 below:

$$\hat{O}_i \leftarrow n_i^{-1} \Sigma_{j \in N_i}(\hat{O}_j + \hat{O}_{ji}) \log \hat{\alpha}_i \leftarrow n_i^{-1} \Sigma_{j \in N_i}(\log \hat{\alpha}_j + \log \hat{\alpha}_{ji}) \quad (9)$$

The synchronization module 202 further performs the second level of synchronization by updating the synchronization parameters to convert the first timestamp of each of the plurality of events to the second timestamp with respect to a common reference timestamp. For example, consider the common reference timestamp is denoted by "t" and a device "i" whose clock displays the first timestamp as given in equation 3 below:

$$T_i(t) = \alpha_i t + O_i \quad (3)$$

Wherein,
$\alpha_i$ is skew drift of the device i's clock with respect to the common reference timestamp;
$O_i$ is offset value of the device i's clock with respect to the common reference timestamp.

In an embodiment, if each device of the one or more devices 102 includes estimate of its skew drift and offset value, the device may imprint the common reference timestamp. The above equation (1) can be written for another device j's time with respect to the device i's time as given below in equation 4:

$$T_j(t) = (\alpha_j/\alpha_i)T_i(t) + (O_j - (\alpha_j/\alpha_i)O_i) = \alpha_{ij}T_i(t) + O_{ij} \quad (4)$$

Wherein,
$\alpha_{ij}$ is skew drift of the device j's clock with respect to the device i's clock;
$O_{ij}$ is offset value of the device j's clock with respect to the device i's clock.

In an embodiment, the first level of synchronization ensures that the skew drift ($\alpha_{ij}$) and the offset value ($O_{ij}$) of the plurality of events associated with the one or more processes of the one or more devices 102 are well-estimated. Estimating the skew drift and the offset value involves a series of steps such as, filtering to reduce noise. The noise sources may include, but is not limited to, protocol delays, hardware latch delays, transmission delays, propagation delays, and the like. The noise may be filtered using one or more techniques such as, recursive least squares estimates and other filtering techniques. The one or more filtering techniques aims at reducing the errors/noises and provide a better estimate of pairwise skew drift and offset value. The skew draft and the offset value are referred as the synchronization parameters and stored in the memory 106.

Figure 4:
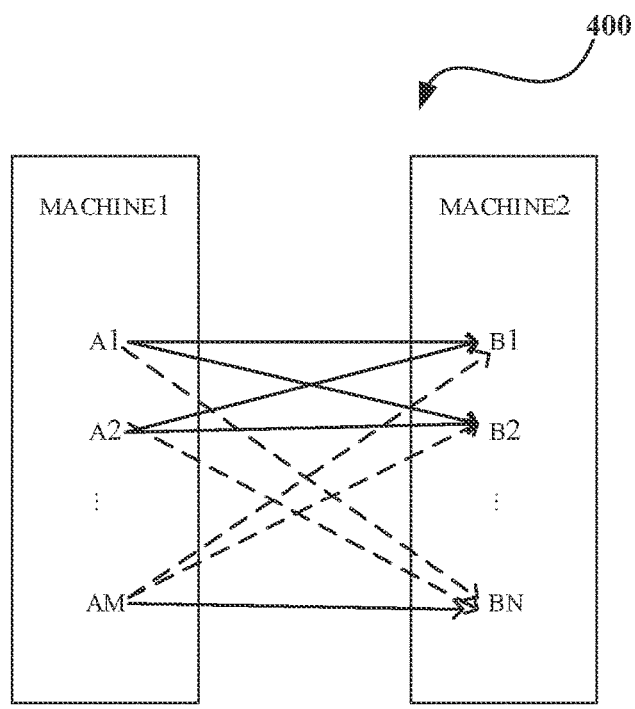
FIG. 4 illustrates an exemplary embodiment for mapping plurality of events associated with one or more processes in an assembly line for tracing an entity, in accordance with some embodiments of present disclosure.

Further, the synchronization module 202 maps the plurality of events based on weights assigned to each pair of events of the plurality events and weights assigned to each event within each of the pair of events. The weights assigned to each of the plurality of events is based on the predefined parameters. The predefined parameters comprise arrival time, departure time, processing duration of the entity and number of distinct data associated with the plurality of events. Upon mapping, the synchronization module 202 may trace the entity obtained from the one or more processes in the assembly line based on the mapping of the plurality of events. For example, FIG. 4 shows an exemplary embodiment for mapping plurality of events associated with the one or more processes in the assembly line for tracing an entity. As shown, consider machine1 and machine2 are the two pick-up-place machine of the manufacturing industry and A1, A2, . . . Am and B1, B2 . . . , Bn are the plurality of events of the machine 1 and machine 2, respectively. The weights assigned to the plurality of events are based on goodness of association of each departure time in the releasing machine1 and the arrival time in the receiving machine2. In an embodiment, the plurality of events which are inconsistent are assigned zero weight. Similarly, the plurality of events having large distances between the arrival time and the departure time are also assigned low weight. In an embodiment, one way to assign weights is to use likelihood function p (•). However, if the likelihood function is not known, parametric model and fit parameters may be used to assign the weights. For example, the weight between, an exit event A1 and an entry event B2, may be assigned by using equation 5.

$$w_{A_1B_2}=w_A(A_1)p_{AB}(d_{B_2}-d_{A_1})w_B(B_2) \quad (5)$$

Upon assigning weight, the synchronization module 202 performs maximum weight matching using a weighted bipartite graph. A graph is called weighted bipartite graph if each edge in graph had an associated weight. Further, upon assigning weights to the plurality of events the one or more devices 102 may be associated into a single association to trace the entity.

In an embodiment, the other module 203 may include defect identification module for identifying one or more defects in the entity based on a corresponding quality value assigned to the entity. The quality value is a combination of weights assigned to each of the plurality of events. Upon identifying, the defect identification module may recall the entity associated with one or more defects for repairing or replacing the entity. For example, in a sensor manufacturing industry, consider the sensor which is manufactured is faulty. The defect identification module may identify the defect and replace/repair the sensor.

The one or more modules 107 may also include other modules 203 to perform various miscellaneous functionalities of the synchronization system 101. It will be appreciated that such modules may be represented as a single module or a combination of different modules.

Figure 5:
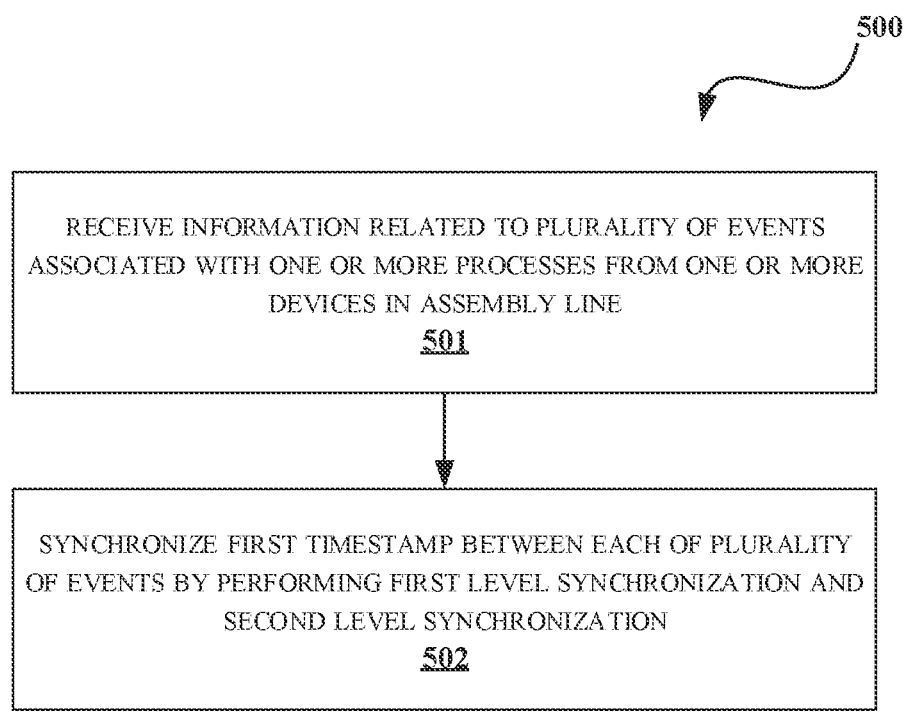
FIG. 5 illustrates a flow diagram showing an exemplary method for synchronizing plurality of events associated with one or more processes in an assembly line, in accordance with some embodiments of present disclosure.

FIG. 5 illustrates a flow diagram showing an exemplary method for synchronizing plurality of events associated with one or more processes in the assembly line, in accordance with some embodiments of present disclosure.

As illustrated in FIG. 5, the method 500 may include one or more blocks for executing processes in the synchronization system 101. The method 500 may be described in the general context of computer executable instructions. Generally, computer executable instructions can include routines, programs, objects, components, data structures, procedures, modules, and functions, which perform particular functions or implement particular abstract data types.

The order in which the method 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, receiving, by the information reception module 201, information related to the plurality of events associated with the one or more processes from one or more devices 102 in the assembly line. Each of the plurality of events comprises a respective first timestamp.

Particularly, the information reception module 201 may receive the information related to the plurality of events by analysing one or more parameters related to the one or more devices 102 in the assembly line. The information relates to the plurality of events associated with the one or more processes of the one or more devices 102. Upon analysing, the information reception module 201 may identify one or more sensors and positioning of the one or more sensors at the one or more devices 102. Upon identifying, the information reception module 201 may determine the rate for sensing information by the identified one or more sensors. Upon determining the rate, the rate of synchronizing the plurality of events for the first level synchronization is determined. The rate of synchronizing relates to interaction between the one or more devices 102 in the assembly line. Further, the information reception module 201 may determine the network for transmitting the information related to the plurality of events, where the plurality of events is synchronized.

At block 502, synchronizing, by the synchronization module 202, the first timestamp between each of the plurality of events by performing the first level synchronization and the second level synchronization. In the first level synchronization, each of the pair of events of the plurality of events are correlated based on the first timestamp related to respective events in the pair of events to obtain synchronization parameters. Controlling correlation of each of the pair of events of the plurality of events is performed periodically based on rate of skew drift of the plurality of events and frequency of correlating the first timestamp of the plurality of events. In the second level of synchronization, the synchronization parameters are updated to convert the first timestamp of each of the plurality of events to the second timestamp with respect to the common reference timestamp.

In an embodiment, the plurality of events may be mapped based on weights assigned to each pair of events of the plurality events and weights assigned to each event within each of the pair of events. The weights assigned to each of the plurality of events is based on predefined parameters. The predefined parameters may comprise arrival time, departure time, processing duration of the entity and number of distinct data associated with the plurality of events. Upon mapping, the synchronization module 202, may trace the entity obtained from the one or more processes in the assembly line based on the mapping of the plurality of events.

Computing System

Figure 6:
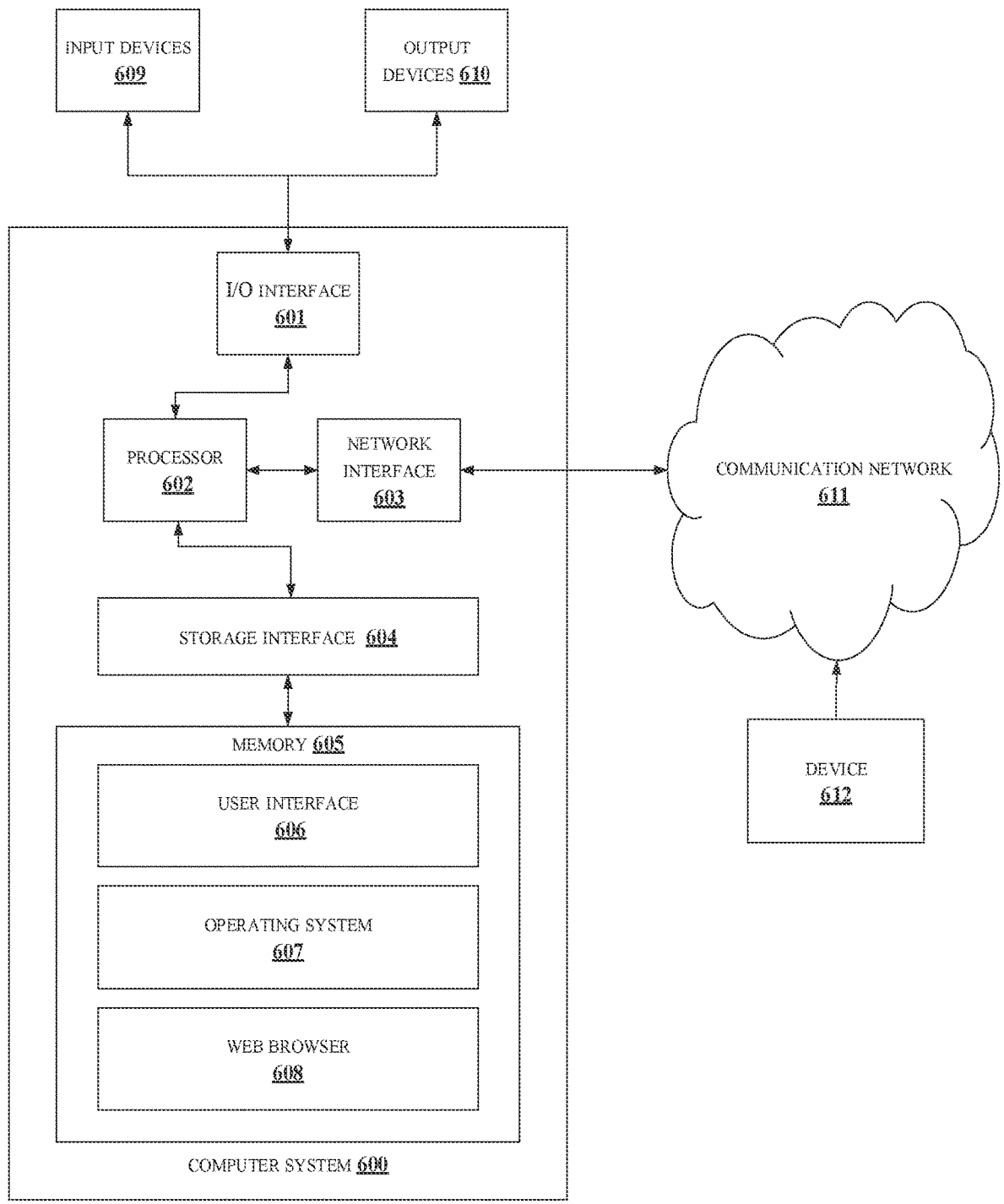
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the synchronization system 101. The computer system 600 may include a central processing unit ("CPU" or "processor") 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices 609 and 610 via VO interface 601. The I/O interface 601 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 602 may be disposed in communication with the communication network 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with a device 612 for synchronizing plurality of events associated with one or more processes in the assembly line for tracing the entity. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 608 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C #, Microsoft.NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for synchronizing plurality of events associated with one or more processes of the one or more devices in the assembly line for tracing the entity. Thus, the entity may be traced efficiently and replaced or repaired in case of any defects.

An embodiment of the present disclosure assigns weight to each of the plurality of events which helps in enabling better traceability of the entity in case when an issue is detected and thus reduces cost for tracing the entity.

An embodiment of the present disclosure helps in improving the synchronization performance by providing feedback to the network architecture when the first timestamp of the plurality of events are not synchronized.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Synchronization system |
| 102 | Device |
| 103 | Communication network |
| 104 | Processor |
| 105 | I/O interface |
| 106 | Memory |
| 107 | Modules |
| 108 | Data |
| 201 | Information Reception Module |
| 202 | Synchronization Module |
| 203 | Other Modules |
| 204 | Input Data |
| 205 | Timestamp Data |
| 206 | Other Data |
| 600 | Computer System |
| 601 | I/O Interface |
| 602 | Processor |
| 603 | Network Interface |
| 604 | Storage Interface |
| 605 | Memory |
| 606 | User Interface |
| 607 | Operating System |
| 608 | Web Browser |
| 609 | Input Devices |
| 610 | Output Devices |
| 611 | Communication Network |
| 612 | Device |

What is claimed is:

1. A method for synchronizing plurality of events associated with one or more processes in an assembly line of a manufacturing industry for tracing an entity, the method comprising:

receiving, by a synchronization system, information related to a plurality of events associated with the one or more processes from one or more devices in the assembly line, wherein the plurality of events are procedures associated with manufacturing of the entity at the manufacturing industry and wherein each of the plurality of events comprises a respective first time stamp, wherein receiving the information related to the plurality of events comprises:

analysing, by the synchronization system, one or more parameters related to the one or more devices in the assembly line, wherein the one or more parameters comprises parameters related to determining if a machine of the manufacturing industry is a legacy machine used for manufacturing the entity, or if the machine is internet worked or not internetworked, or determining if modifications are possible to the machines;

identifying, by the synchronization system, one or more sensors and positioning of the one or more sensors at the one or more devices;

determining, by the synchronization system, a rate for sensing information by the identified one or more sensors, wherein the information relates to the plurality of events associated with the one or more processes of the one or more devices;

determining, by the synchronization system, a rate of synchronizing the plurality of events for the first level synchronization, wherein the rate of synchronizing relates to interaction between the one or more devices in the assembly line; and determining, by the synchronization system, a network for transmitting the information related to the plurality of events, wherein the plurality of events is synchronized, wherein the transmission of the information is performed such that the entity is traced despite congestion and packet error during the transmission of the information, wherein mode of transmission of the information is based on distance over which the data is transported for synchronization;

synchronizing, by the synchronization system, the first timestamp between each of the plurality of events by performing a first level synchronization and a second level synchronization, wherein the first level synchronization comprises correlating each of a pair of events of the plurality of events based on the first timestamp related to respective events in the pair of events to obtain synchronization parameters comprising a skew drift ($\alpha$) and an offset value (O) related to the first timestamp of each of the plurality of events and wherein the pair of events are correlated based on the skew drift rate and frequency of interaction between the one or more devices associated with the plurality of events, wherein the first level of synchronization estimates the synchronization parameters of the plurality of events associated with the one or more processes of the one or more devices by filtering using recursive least squares estimates, wherein a device "i" maintains number of offset update measurements $M_{ij}$ comprising estimate of $\alpha_{ij}$ and estimate of $O_{ij}$ from a device "j" to the device "j" and the device i makes the network update only if all neighbours' $M_{ij}$'s at the device i are balanced and the update is performed using: $\hat{O}_i \leftarrow (1-a)\hat{O}_i + a(\hat{O}_j + \hat{O}_{ji})$ and wherein the second level of synchronization comprises updating the synchronization parameters to convert the first timestamp of each of the plurality of events to a second timestamp with respect to a common reference timestamp, wherein the common reference timestamp is denoted by "t" and a clock of device "i" displays the first timestamp as: $T_i(t)=\alpha_i t+O_i$, wherein, $\alpha_i$ is skew drift of the device i's clock with respect to the common reference timestamp; $O_i$ is offset value of the device i's clock with respect to the common reference timestamp, wherein when each device of the one or more devices comprises estimate of the skew drift and offset value, the device imprints the common reference timestamp as:

$T_j(t)=(\alpha_j/\alpha_i)T_i(t)+(O_j-(\alpha_j/\alpha_i)O_i)=\alpha_{ij} T_i(t)+O_{ij}$ where, $\alpha_{ij}$ is skew drift of the device j's clock with respect to the device i's clock;

$O_{ij}$ is offset value of the device j's clock with respect to the device i's clock;

identifying, by the synchronization system, one or more defects in the entity based on a corresponding quality value assigned to the entity, wherein the quality value is a combination of weights assigned to each of the plurality of events; and recalling, by the synchronization system, the entity associated with the one or more defects and replacing with a new entity; and providing, by the synchronization system, feedback to the network for one or more corrective actions when the first timestamp of the plurality of events are not synchronized.

2. The method of claim 1, wherein upon synchronizing the first timestamp, further comprises:

mapping, by the synchronization system, the plurality of events based on the weights assigned to each pair of events of the plurality events and weights assigned to each event within each of the pair of events; and tracing, by the synchronization system, an entity obtained from the one or more processes in the assembly line based on the mapping of the plurality of events.

3. The method of claim 2, wherein the weights assigned to each of the plurality of events is based on predefined parameters, and wherein the predefined parameters comprise arrival time, departure time, processing duration and number of distinct data associated with the plurality of events.

4. A synchronization system for synchronizing plurality of events associated with one or more processes in an assembly line of a manufacturing industry for tracing an entity, comprising:

a processor; and a memory communicatively coupled to the processor, wherein the memory stores processor-executable instructions, which, on execution, cause the processor to:

receive information related to a plurality of events associated with the one or more processes from one or more devices in the assembly line, wherein each of the plurality of events comprises a respective first timestamp, wherein the plurality of events are procedures associated with manufacturing of the entity at the manufacturing industry and wherein the processor receives the information related to the plurality of events by:

analysing one or more parameters related to the one or more devices in the assembly line, wherein the one or more parameters comprises parameters related to determining if a machine of the manufacturing industry is a legacy machine used for manufacturing the entity, or if the machine is internet worked or not internetworked, or determining if modifications are possible to the machines;

identifying one or more sensors and positioning of the one or more sensors at the one or more devices;

determining a rate for sensing information by the identified one or more sensors, wherein the information relates to the plurality of events associated with the one or more processes of the one or more devices;

determining a rate of synchronizing the plurality of events for the first level synchronization, wherein the rate of synchronizing relates to interaction between the one or more devices in the assembly line; and determining a network for transmitting the information related to the plurality of events, wherein the plurality of events is synchronized, wherein the transmission of the information is performed such that the entity is traced despite congestion and packet error during the transmission of the information, wherein mode of transmission of the information is based on distance over which the data is transported for synchronization;

synchronize the first timestamp between each of the plurality of events by performing a first level synchronization and a second level synchronization, wherein the first level synchronization comprises correlating each of a pair of events of the plurality of events based on the first timestamp related to respective events in the pair of events to obtain synchronization parameters comprising a skew drift ($\alpha$) and an offset value (O) related to the first timestamp of each of the plurality of events and wherein the pair of events are correlated based on the skew drift rate and frequency of interaction between the one or more devices associated with the plurality of events, wherein the first level of synchronization estimates the synchronization parameters of the plurality of events associated with the one or more processes of the one or more devices by filtering using recursive least squares estimates, wherein a device "i" maintains number of offset update measurements $M_{ij}$ comprising estimate of $\alpha_{ij}$ and estimate of $O_{ij}$ from a device "j" to the device "j" and the device i makes the network update only if all neighbours' $M_{ij}$'s at the device i are balanced and the update is performed using: $\hat{O}_i \leftarrow (1-a)\hat{O}_i + a(\hat{O}_j + \hat{O}_{ji})$ and wherein the second level of synchronization comprises updating the synchronization parameters to convert the first timestamp of each of the plurality of events to a second timestamp with respect to a common reference timestamp, wherein the common reference timestamp is denoted by "t" and a clock of device "i" displays the first timestamp as: $T_i(t) = \alpha_i t + O_i$, wherein, $\alpha_i$ is skew drift of the device i's clock with respect to the common reference timestamp; $O_i$ is offset value of the device i's clock with respect to the common reference timestamp, wherein when each device of the one or more devices comprises estimate of the skew drift and offset value, the device imprints the common reference timestamp as:

$$T_j(t) = (\alpha_j/\alpha_i) T_i(t) + (O_j - (\alpha_j/\alpha_i) O_i) = \alpha_{ij} T_i(t) + O_{ij}$$

where, $\alpha_{ij}$ is skew drift of the device i's clock with respect to the device i's clock;

$O_{ij}$ is offset value of the device j's clock with respect to the device i's clock;

identify one or more defects in the entity based on a corresponding quality value assigned to the entity, wherein the quality value is a combination of weights assigned to each of the plurality of events; and recall the entity associated with the one or more defects and replacing with a new entity; and provide feedback to a network for one or more corrective actions when the first timestamp of the plurality of events are not synchronized.

5. The synchronization system of claim 4, wherein upon synchronizing the first timestamp, the processor is configured to:

map the plurality of events based on weights assigned to each pair of events of the plurality events and weights assigned to each event within each of the pair of events; and trace an entity obtained from the one or more processes in the assembly line based on the mapping of the plurality of events.

6. The synchronization system of claim 4, wherein the weights assigned to each of the plurality of events is based on predefined parameters, and wherein the predefined parameters comprise arrival time, departure time, processing duration and number of distinct data associated with the plurality of events.

7. One or more non-transitory machine-readable information storage mediums comprising one or more instructions which when executed by one or more hardware processors cause:

receiving information related to a plurality of events associated with the one or more processes from one or more devices in the assembly line, wherein each of the plurality of events comprises a respective first timestamp, wherein the plurality of events are procedures associated with manufacturing of the entity at the manufacturing industry and wherein receiving the information related to the plurality of events comprises:

analysing, by the synchronization system, one or more parameters related to the one or more devices in the assembly line, wherein the one or more parameters comprises parameters related to determining if a machine of the manufacturing industry is a legacy machine used for manufacturing the entity, or if the machine is internet worked or not internetworked, or determining if modifications are possible to the machines;

identifying, by the synchronization system, one or more sensors and positioning of the one or more sensors at the one or more devices;

determining, by the synchronization system, a rate for sensing information by the identified one or more sensors, wherein the information relates to the plurality of events associated with the one or more processes of the one or more devices;

determining, by the synchronization system, a rate of synchronizing the plurality of events for the first level synchronization, wherein the rate of synchronizing relates to interaction between the one or more devices in the assembly line; and determining, by the synchronization system, a network for transmitting the information related to the plurality of events, wherein the plurality of events is synchronized, wherein the transmission of the information is performed such that the entity is traced congestion and packet error during the transmission of the information, wherein mode of transmission of the information is based on distance over which the data is transported for synchronization;

synchronizing the first timestamp between each of the plurality of events by performing a first level synchronization and a second level synchronization, wherein the first level synchronization comprises correlating each of a pair of events of the plurality of events based on the first timestamp related to respective events in the pair of events to obtain synchronization parameters comprising a skew drift ($\alpha$) and an offset value (O)

related to the first timestamp of each of the plurality of events and wherein the pair of events are correlated based on the skew drift rate and frequency of interaction between the one or more devices associated with the plurality of events, wherein the first level of synchronization estimates the synchronization parameters of the plurality of events associated with the one or more processes of the one or more devices by filtering using recursive least squares estimates, wherein a device "i" maintains number of offset update measurements Mij comprising estimate of $\alpha_{ij}$ and estimate of Oij from a device "j" to the device "j" and the device i makes the network update only if all neighbours' Mij's at the device i are balanced and the update is performed using: $\hat{O}i \leftarrow (1-a)\hat{O}i + a(\hat{O}j + \hat{O}ji)$ and wherein the second level of synchronization comprises updating the synchronization parameters to convert the first timestamp of each of the plurality of events to a second timestamp with respect to a common reference timestamp, wherein the common reference timestamp is denoted by "t" and a clock of device "i" displays the first timestamp as: $Ti(t) = \alpha_i t + O_i$, wherein, $\alpha_i$ is skew drift of the device i's clock with respect to the common reference timestamp; Oi is offset value of the device i's clock with respect to the common reference timestamp, wherein when each device of the one or more devices comprises estimate of the skew drift and offset value, the device imprints the common reference timestamp as:

$$Tj(t) = (\alpha_j/\alpha_i)Ti(t) + (Oj \cdot (\alpha_j/\alpha_i)Oi) = \alpha_{ij} Ti(t) + Oij$$

where,
$\alpha_{ij}$ is skew drift of the device j's clock with respect to the device i's clock;
Oij is offset value of the device j's clock with respect to the device i's clock;
identifying, by the synchronization system, one or more defects in the entity based on a corresponding quality value assigned to the entity, wherein the quality value is a combination of weights assigned to each of the plurality of events; and
recalling, by the synchronization system, the entity associated with the one or more defects and replacing with a new entity; and
providing, by the synchronization system, feedback to a network for one or more corrective actions when the first timestamp of the plurality of events are not synchronized.

8. The one or more non-transitory machine-readable information storage mediums of claim 7, wherein upon synchronizing the first timestamp, further comprises:
mapping the plurality of events based on weights assigned to each pair of events of the plurality events and weights assigned to each event within each of the pair of events; and
tracing an entity obtained from the one or more processes in the assembly line based on the mapping of the plurality of events.

9. The one or more non-transitory machine-readable information storage mediums of claim 8, wherein the weights assigned to each of the plurality of events is based on predefined parameters, and wherein the predefined parameters comprise arrival time, departure time, processing duration and number of distinct data associated with the plurality of events.

* * * * *